(12) United States Patent
Podhrázký

(10) Patent No.: US 11,033,991 B2
(45) Date of Patent: *Jun. 15, 2021

(54) SHRINK-FITTING APPLIANCE FOR PREFERABLY MOBILE USE

(71) Applicant: Haimer GmbH, Hollenbach-Igenhausen (DE)

(72) Inventor: Antonín Podhrázký, Jemnice (CZ)

(73) Assignee: HAIMER GMBH, Hollenbach (DE)

( * ) Notice: Subject to any disclaimer, the term of this patent is extended or adjusted under 35 U.S.C. 154(b) by 254 days.

This patent is subject to a terminal disclaimer.

(21) Appl. No.: 16/066,516

(22) PCT Filed: Dec. 21, 2016

(86) PCT No.: PCT/EP2016/082261
§ 371 (c)(1),
(2) Date: Jun. 27, 2018

(87) PCT Pub. No.: WO2017/114730
PCT Pub. Date: Jul. 6, 2017

(65) Prior Publication Data
US 2019/0001446 A1 Jan. 3, 2019

(30) Foreign Application Priority Data
Dec. 28, 2015 (DE) .......................... 102015016830.4

(51) Int. Cl.
*B23P 11/02* (2006.01)
*H05B 6/10* (2006.01)
(Continued)

(52) U.S. Cl.
CPC ............ *B23P 11/027* (2013.01); *H05B 6/101* (2013.01); *H05B 6/14* (2013.01); *H05B 6/38* (2013.01); *H05B 6/42* (2013.01)

(58) Field of Classification Search
CPC .......... B23P 11/027; H05B 6/101; H05B 6/14
See application file for complete search history.

(56) References Cited

U.S. PATENT DOCUMENTS 3,790,735 A * 2/1974 Peters, Jr. .............. H05B 6/129
219/622
3,855,454 A * 12/1974 Eisen .................... G06M 3/022
377/38
(Continued)

FOREIGN PATENT DOCUMENTS

CN 101829923 A * 9/2010
CN 101829923 A 9/2010
(Continued)

OTHER PUBLICATIONS

International Search Report dated Jul. 6, 2017 in parent case PCT/EP2016/082261.
(Continued)

*Primary Examiner* — Ibrahime A Abraham
*Assistant Examiner* — John J Norton
(74) *Attorney, Agent, or Firm* — Polson Intellectual Property Law, PC; Margaret Polson; Christopher Sylvain (57) ABSTRACT

Shrink-fitting device for clamping and unclamping tools that have a tool shank, having a tool receptacle which has a sleeve part that is open at its free end and is made of electrically conductive material, for receiving the tool shank in a frictional manner, and having an induction coil that encloses the sleeve part of the tool receptacle, is able to be subjected to a high-frequency alternating current and is configured as a ring coil or a cylindrical coil, for heating the sleeve part, wherein the induction coil bears, on its outer circumference, a first casing made of magnetically conductive and electrically non-conductive material, and the device comprises power semiconductor components for producing an alternating current feeding the induction coil, and an induction coil housing that preferably consists of insulating material, wherein the induction coil and its first casing are surrounded at the outer circumference by a second casing which consists of magnetically non-conductive material and
(Continued)

electrically conductive material and is designed such that a stray field that occurs in the vicinity thereof generates eddy currents in the second casing and as a result the stray field is weakened, and in that at least the power semiconductor components are accommodated together with the induction coil in an induction coil housing which encloses the induction coil, the first and second casing thereof, and the power semiconductor components, at least around the circumference of the induction coil.

25 Claims, 6 Drawing Sheets

(51) Int. Cl.
*H05B 6/14* (2006.01)
*H05B 6/38* (2006.01)
*H05B 6/42* (2006.01)

(56) References Cited

U.S. PATENT DOCUMENTS

| 4,017,701 A | 4/1977 | Mittelmann |
| 2004/0160020 A1 | 8/2004 | Irion |
| 2005/0188522 A1 | 9/2005 | Haimer |
| 2008/0219034 A1 | 9/2008 | Haimer |
| 2012/0097663 A1 | 4/2012 | Ito |
| 2016/0169751 A1 | 6/2016 | Zenzen |

FOREIGN PATENT DOCUMENTS

| CN | 203151780 U | 8/2013 |
| DE | 19915412 A1 | 10/2000 |
| DE | 10102710 A1 | 9/2002 |
| DE | 102005014984 A1 | 10/2006 |
| DE | 102008045781 A1 | 3/2010 |
| EP | 0658068 A2 | 6/1995 |
| EP | 1273759 B1 | 2/2013 |
| WO | 2013167686 A2 | 11/2013 |

OTHER PUBLICATIONS

Written Opinion of the International Searching Authority dated Jul. 6, 2017 in parent case PCT/EP2016/082261.

Office Action dated Aug. 3, 2020 in related Chinese application 201680081190.1.

\* cited by examiner

SHRINK-FITTING APPLIANCE FOR PREFERABLY MOBILE USE

BACKGROUND

The present disclosure relates to a shrinking device for shrink gripping and shrink releasing tools, comprising a tool shank and having a tool receptacle comprising a sleeve portion open at the exposed end thereof for receiving the tool shank with a friction fit and made of an electrically conductive material, and having an induction coil enclosing the sleeve portion of the tool receptacle.

Shrinking devices for shrink gripping and shrink releasing tool shanks in tool holders have been known for some time. Such shrinking devices were originally operated by means of a gas burner or hot air, by means of which the sleeve portion of the tool holder was made hot in order to expand said holder wide enough to be able to receive a tool shank in a press fit or to release the same. Recently shrinking devices wherein, the tool holder is heated by means of an induction coil have become widespread. This has substantially accelerated the shrinking process and made it more efficient and easier to perform, thus contributing to widespread use.

The first shrinking device usable for practical applications is described in the patent literature by German patent specification DE 199 15 412.

Previously known shrinking devices are disadvantageously large. This is because said devices require a more or less large electrical enclosure in which the power electronics and typically also the associated controller is located, said enclosure being located adjacent to the induction coil or in a table frame. The known shrinking devices therefore form a nontransportable station in practice, to which the tool holder having the tool to be changed out must be transported in order to transport said tool holder back to the particular machine tool. This has previously been accepted.

The foregoing examples of the related art and limitations therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

Proceeding from the foregoing, an aspect of the present disclosure is to disclose a shrinking device that is substantially more compact than the previously known shrinking devices, therefore forming a suitable starting point for conceiving a shrinking device for transportable applications—ideally such that the shrinking device is a device to be transported in the manner of a small suitcase and can be used by the operator in a novel manner, in that said device is quickly mounted on the machine tool for which a tool change is needed and used there in order to perform a tool change on site at the machine.

This does not, of course, exclude cases where the shrinking device is also used in a conventional, stationary manner on a corresponding mounting device, but transportable application is preferable.

This aspect is achieved by a shrinking device for shrink gripping and shrink releasing tools comprising a tool shank as described herein.

The shrinking device comprises a tool receptacle comprising a sleeve portion open at the exposed end thereof for receiving the tool shank with a friction fit and made of an electrically conductive material. The shrinking device further comprises an induction coil for heating the sleeve portion and enclosing the sleeve portion of the tool receptacle, having a preferably high-frequency (and ideally comprising a frequency of typically greater than 1 kHz) alternating current applied thereto, and implemented as an annular or cylindrical coil. The induction coil thereby supports a first casing made of a magnetically conductive and electrically nonconductive material, such as ferrite or a powdered metal material, on the outer circumference thereof. Electrically nonconductive material in the sense of the present disclosure need not necessarily be an insulator. A material is considered to be nonconductive if the eddy currents induced by magnetic fields cause only slight or no heating in the material. Further components of the shrinking device of the present disclosure are power semiconductor components for producing an alternating current feeding the induction coil. IGBTs are typically used here. However, thyristors or MOSFETs can also be used. The shrinking device of the present disclosure also comprises an induction coil housing, typically made of plastic. Such an induction coil housing typically does not provide any detectable magnetic shielding effect, or none at all. Said housing serves only for protecting the components present therein against external influences while simultaneously preventing the operator from coming into contact with any components carrying electrical voltage. The shrinking device of the present disclosure is characterized in that the induction coil and the first casing thereof are enclosed at the outer circumference by a second casing. Said second casing is made of a magnetically nonconductive and electrically conductive material. Said casing is designed so that any stray magnetic field induces electrical currents therein and thus extracts energy from the stray magnetic field, thereby weakening said field. This means that the casing eliminates the stray magnetic field in the surrounding area thereof, or at least attenuates said field such that any residual stray magnetic field in the immediate surrounding area thereof—preferably without additional measures but in lieu thereof in conjunction with further supporting measures—is so slight that said field exerts no negative influence on power semiconductor components disposed there.

The present solution according to the present disclosure is further characterized in that at least the power semiconductor components, together with the induction coil, are accommodated in an induction coil housing. The induction coil housing is preferably made of an insulating material or is coated with such a material on the exterior thereof. Said housing comprises the following components on the circumference thereof or in the interior thereof: the induction coil, the first and second casing thereof, and at least the power semiconductor components, preferably also the capacitors present directly in the power circuit and/or the controller.

"Enclosing" is understood to mean, as a minimum, externally surrounding, at least along the circumference of the induction coil. As a rule, the induction coil housing also extends into the region of the upper and lower end faces and partially or fully covers the same. Said housing then has a cup-like shape. The induction coil housing typically has no wall penetrations, at least at the circumference thereof, except for one local penetration necessary to the functionality thereof, that is, for the infeed or the like.

The shrinking device is preferably designed such that the power semiconductor components thereof are disposed directly on the outer circumference of the second casing. Directly on the outer circumference can mean at up to 60 mm, preferably only up to 15 mm maximum radial spacing from the outer circumference surface of the second casing of the induction coil. If said casing is not present, then the outer circumference surface of the first casing applies. Ideally, however, at least one surface of the power semiconductor components makes direct contact for transferring heat with the second casing, potentially having an intermediate adhesive layer. The second casing is designed to form a heat sink for the power semiconductor components. The second casing then absorbs the heat losses arising in the power semiconductor components and dissipates said heat from the same.

It has been found to be particularly advantageous if the second casing comprises one or more recesses, each receiving a power semiconductor component, so that the semiconductor component is enclosed by the second casing on at least three or preferably four sides. Such a recess in the second casing forms a region particularly protected from any residual stray magnetic fields. This is because the stray magnetic field lines are not capable of penetrating into said deeper recess in which the power semiconductor component is present. Rather, said field lines are absorbed by the surrounding, higher or radially further outward regions of the second casing.

It has been found to be particularly advantageous if the shrinking device comprises of at least one rectifier, and at least one smoothing capacitor and oscillating circuit capacitors, involved in the production of a high-frequency alternating voltage internal to the device, comprising of an induction coil. The capacitors are grouped about the outer circumference thereof—typically such that the capacitors form a cylindrical ring enclosing the induction coil when theoretically rotated about the center of the coil. Here again, the capacitors should be disposed directly on the outer circumference of the second casing of the induction coil. In this context, the term "directly on the outer circumference" can be understood to be a maximum spacing of up to 125 mm, preferably up to 40 mm, measured from the outer circumference of the second casing of the induction coil. If said casing is not present, then the outer circumference surface of the first casing applies.

According to a particularly advantageous embodiment of the shrinking device, for which dependent and independent protection is sought, an induction coil for shrink gripping and shrink releasing tool shanks from tool holders is enclosed by a first casing made of magnetically conductive and electrically nonconductive material, wherein the induction coil and the first casing thereof are enclosed by a second casing made of magnetically nonconductive and electrically conductive material. The preceding applies to the second casing. Said second casing is ideally also designed so that eddy currents are generated therein under the influence of a stray magnetic field of the induction coil permeating said casing, leading to eliminating the influence of the stray magnetic field at the outer surface of the second casing. The principle known as counterinduction can optionally be made use of here. Eddy currents are generated in the second casing by the stray magnetic field permeating said casing, and in turn generate a counterfield eliminating the interfering stray magnetic field, at least to the extent that power semiconductor components can be accommodated near the second casing without suffering permanent damage.

According to a further particularly advantageous embodiment of the shrinking device, for which dependent and independent protection is sought, an induction coil for shrink gripping and shrink releasing tools from tool holders is accommodated in the induction coil housing enclosing the same, together with the power semiconductor components associated therewith required for producing the alternating voltage feeding the induction coil and optionally converted from the mains voltage. Further components, such as capacitors present in the power circuit and/or a rectifier and/or a transformer and/or the electronic controller are also preferably accommodated within the induction coil housing. A second casing is not present in the present embodiment. Said casing can optionally be substituted for, in that the power semiconductor components and/or the control electronics and/or the rectifier each in turn have a shielded housing or are accommodated in shielded compartments. At least the power semiconductor components are thereby preferably actively cooled, such as by means of the coolant supply for the machine tool. This option is possible at greater cost and is therefore included in the scope of protection.

In this manner, a particularly compact shrinking device is achieved and said device no longer requires a separate, large electrical enclosure standing adjacent to the shrinking device and in which said components are separately accommodated. The goal of a transportable shrinking device is thereby made significantly closer.

All variants of the shrinking device of the present disclosure are preferably designed so that the end face of the induction coil facing away from the tool receptacle has a cover made of a magnetically conductive and electrically nonconductive material. Said cover is ideally implemented as a pole shoe covering the entire end face of the induction coil. This is particularly important here in order to prevent damaging stray magnetic fields in the outer region. In exceptional cases, the cover does not physically cover the entire end face of the induction coil, but magnetically.

It has been found to be particularly advantageous if the cover comprises a local shielding collar in the center near the sleeve portion, said collar protruding past the exposed end face of the sleeve portion of the tool holder in the direction of the longitudinal axis L, preferably by at least twice the tool diameter. Such a shielding collar prevents the tool shank near the sleeve portion from being exposed to a damaging stray magnetic field and from being the starting point for such a stray magnetic field extending from there into the surrounding area and exerting a damaging influence, to be prevented, on the power semiconductor components disposed in the immediate vicinity of the induction coil.

It is advantageous if the end face of the induction coil facing toward the tool receptacle is also covered by a magnetically conductive and electrically nonconductive material and preferably fully covered except for the receiving opening for the tool holder.

According to a particularly preferred embodiment, the shrinking device comprises at least one electrical circuit board disposed directly on the outer circumference of the induction coil or enclosing the outer circumference of the induction coil preferably in the manner of a ring mostly or completely closed in the circumferential direction, and electrically contacting the capacitors and/or the power semiconductor components present in the power circuit. A circuit board is preferably understood here to be a board approximately at least 0.75 mm thick having conductors made of a metal material applied thereof, but alternatively a film having metal conductors can also be used. It is particularly advantageous if the board is a ring board, the axis of rotational symmetry thereof preferably running coaxial to, or otherwise parallel to, the longitudinal axis of the induction coil.

In the ideal case, two ring boards are present, between which the capacitors present in the power circuit are disposed along the circumference of the induction coil.

According to a particularly preferred embodiment example, the second casing forms one or more cooling channels preferably running in the interior thereof when the second casing is considered as a whole. For this purpose, the second casing can be implemented as a two-part or multipart component. The individual parts of the casing are then sealed off relative to each other. This substantially facilitates the production of interior cooling channels.

According to a further particularly advantageous embodiment of the shrinking device, for which not only dependent but also independent protection not depending on preceding claims is sought, a shrinking device is characterized in that the shrinking device comprises a coupling for attaching the shrinking device to the check of a machine tool spindle. The present embodiment also moves closer to the goal of producing a transportable shrinking device for practical use. It is namely dangerous to work with a transportable shrinking device simply present somewhere in the vicinity of the machine without being somehow operationally securely attached. This problem is eliminated by the coupling of the present disclosure. The coupling allows the shrinking device to be attached to the machine spindle in place of the shrink-fit chuck for which a tool change is required after said chuck has been removed. The shrinking device is held securely for the duration of operation and can then be quickly detached and removed.

In one variant, the coupling can also be used for storing the shrinking device in the tool magazine of the machine tool. Said device can then be automatically loaded into the machine spindle by the tool changer.

In a further variant, the tool changer can retrieve the shrinking device from the tool magazine, but not to install said device in the machine spindle, but rather in order to guide said device directly to a shrinking fixture clamped in the machine spindle and to shrink grip or shrink release the tool. To this end as well the coupling of the shrinking device is particularly advantageous.

The shrinking device is further ideally designed for being able to be supplied with coolant by the cooling system of the machine tool, if said device has an internal cooling system. It is particularly advantageous to design the shrinking device such that the first and, if present, the second casing of the induction coil are accommodated in the interior of a coil housing or coil housing ring together with at least the power semiconductor components and/or the capacitors and/or ideally also the electronics for actuating the power semiconductor components, said housing or housing ring enclosing at least the circumference of the induction coil and preferably also at least partially covering one, preferably both, end faces of the induction coil. In this manner, a compact unit is achieved in which all operationally necessary components are optionally accommodated and are protected from external influences by the common housing and are reliably shielded against contact with electrically live components by the operator.

The coil housing is ideally provided with a plug, typically a protected contact plug (preferably in the form of a plug mounted on the end of a flexible feed line), for directly feeding single-phase alternating current from the public mains (preferably 110 V or 230 V). The shrinking device can thereby be operated nearly anywhere. Said device requires only one outlet plug typical for electrical devices, and optionally a typical extension cord. It is understood that the present disclosure is not necessarily limited to the present particularly preferred type of power supply. The power supply can also be 3-phase and at different voltages, depending on what power level is required in the individual case and which power supply is available at the particular location. Other voltages are possible, of course, particularly in countries using a different mains voltage in the public mains.

Alternatively, it has been found to be particularly advantageous to provide the shrinking device with a battery for feeding the same. Such a device can also be highly portable. It is then possible to provide a transport rack, such as a very maneuverable pushcart, for supporting the battery in the lower region, such as a vehicle starter battery, and providing the shrinking device in the upper region thereof.

Protection is also sought for an overall shrinking system comprising a shrinking device of the present disclosure and characterized in that various couplings attachable to the shrinking device and by means of which the shrinking device can be fixed to the spindle of a machine tool are part of the shrinking system. It is thereby possible to attach the shrinking device to variously equipped machine tool spindles, so that it no longer matters whether the machine tool spindle is equipped with an HSK coupling, for example, or a quick-release taper coupling for drawing in.

An intermediate casing is preferably present between the first and the second casing. Said casing preferably serves as a coolant-carrying element for protecting the second casing and the semiconductor elements mounted thereon against overheating. In contrast to the second casing, said casing is thereby preferably not divided, in order to ensure simple coolant feeding. The intermediate casing is therefore either electrically (not thermally) insulated relative to the second casing or is made of an electrically nonconductive material from the start. It is understood that the coolant supply is sealed off relative to the other components of the shrinking device. Alternative concepts for cooling the second casing without a particularly implemented intermediate ring are conceivable. Of course, said intermediate casing can also be implemented for additionally providing (further) shielding.

In addition to the aspects and embodiments described above, further aspects and embodiments, modes of action, and benefits will become apparent by reference to the accompanying drawings and the detailed description forming a part of this specification.

Before further explaining the depicted embodiments, it is to be understood that the invention is not limited in its application to the details of the particular arrangements shown, since the invention is capable of other embodiments. It is intended that the embodiments and figures disclosed herein are to be considered illustrative rather than limiting. Also, the terminology used herein is for the purposes of description and not limitation.

DETAILED DESCRIPTION

Figure 1:
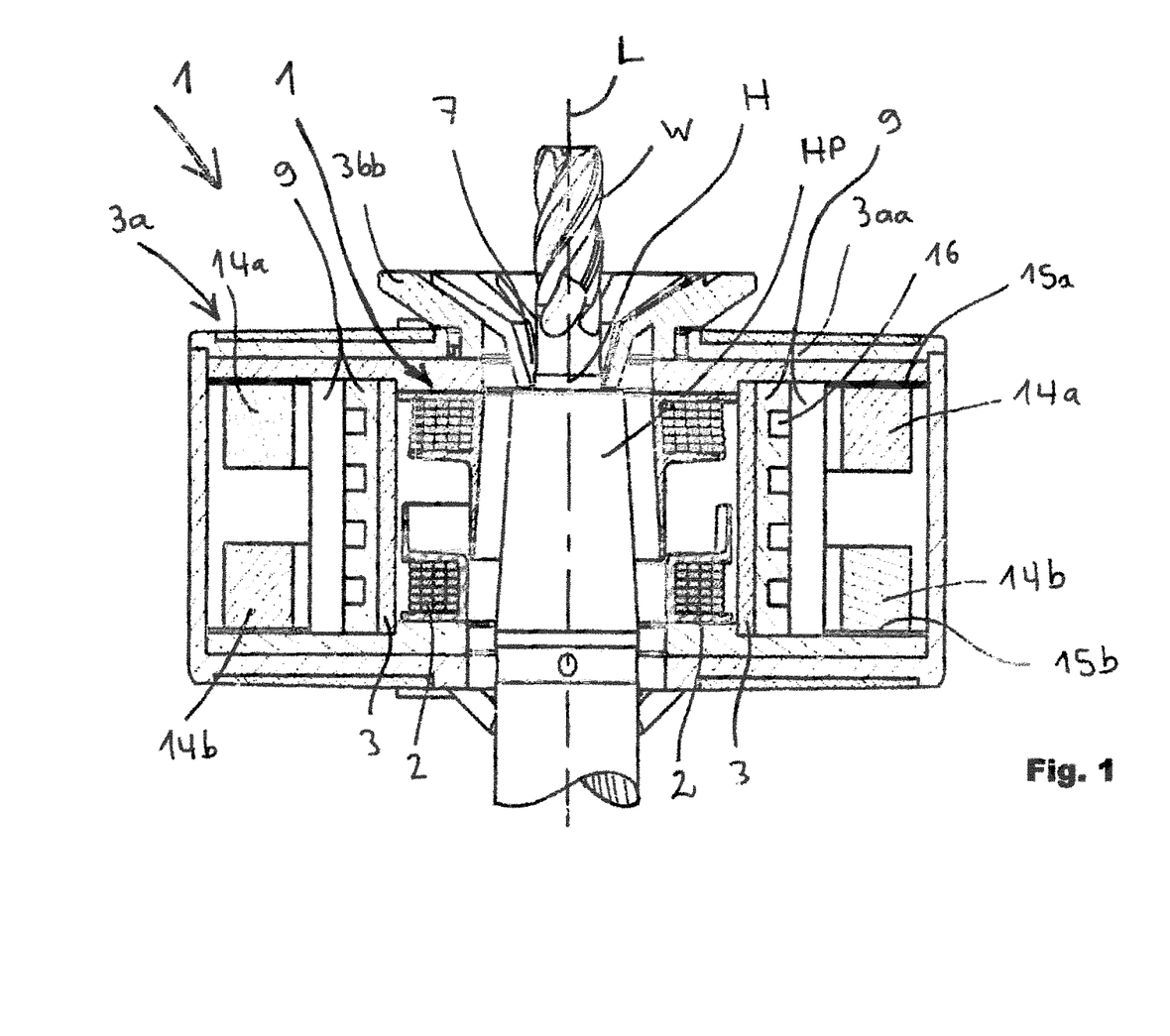
FIG. 1 shows a center longitudinal section of a first embodiment example.

FIG. 1 provides a first fundamental overview of the device of the present disclosure.

The induction coil 1, identified here as having individual windings 2 in the center of which a tool holder 4 is inserted in order to shrink grip or release the holding shank H of a tool W in the sleeve portion HP. The functional principle on which shrink gripping and releasing is based is described in greater detail in the German patent specification DE 199 15 412 A1. The contents thereof are hereby made part of the present application.

The present disclosure places high requirements on the shielding of the induction coil, including on the conventional shielding already per se known.

The induction coil has a first casing 3 on the outer circumference thereof made of electrically nonconductive and magnetically conductive material. The first casing 3 is typically made of either a ferrite or a metal powder or sintered metal material, the individual particles thereof being electrically isolated from each other and in this manner being magnetically conductive and electrically nonconductive. To prevent workaround attempts, it is stated that in exceptional cases a sheet metal casing made of stacked transformer punchings separated from each other by isolating layers is also conceivable. In the vast majority of cases, however, such a sheet metal casing would not meet the intended purpose.

The first casing 3 is particularly preferably implemented to be fully closed in the circumferential direction, thus fully covering the circumferential surface of the coil, so that not even theoretical "magnetic gaps" remain, other than irrelevant local penetrations such as individual and/or small local holes or the like.

In exceptional cases it is conceivable that the casing 3 is implemented to be made of individual segments covering the circumference and comprising certain clearance spaces in between—not shown in the figures. Such an implementation can often function poorly in individual cases, if the radial thickness of the individual segments is selected to be so large in relation to the dimension of the clearance spaces that the field entering into the clearance spaces from the interior is still drawn out in the region of the clearance space, so that no significant stray magnetic field can pass through the clearance spaces.

The shielding made of magnetically conductive and electrically nonconductive material is preferably not solely limited to the first casing.

Rather, a magnetic cover 3a, 3b made of said material adjoins at least one, preferably both end faces and typically contacts the first casing 3.

The magnetic cover 3a on the end face of the induction coil facing away from the tool holder is preferably implemented as an interchangeable, entirely or preferably in segments, pole shoe, that is, as an annular construction having a central opening forming a passage for the tool to be installed or removed. The term "interchangeable" preferably describes interchangeability without tools, ideally by means of a connection made with a bare hand, such as a bayonet connection. In this manner, tool holders for receiving various sizes of tool shank diameter can be processed. It is nevertheless ensured that the end face of each sleeve portion HP reaches the pole shoe and makes contact in the interior of the coil.

The magnetic cover 3b on the end face of the induction coil facing toward the tool holder is preferably designed as an intrinsically flat ring disc, ideally completely covering the windings of the induction coil and comprising a central pass-through opening for the sleeve portion.

It is not obligatory but greatly advantageous for the present disclosure if the magnetic covers 3a, 3b on the end faces (at least locally, preferably to at least 75%, ideally all around) protrude beyond the first casing 3 in the radial direction, preferably by a radial dimension exceeding the radial thickness of the first casing 3 by a multiple, in many cases by at least 4 times. The radial protrusion should preferably run at an angle from 75° to ideally 90° to the longitudinal axis L. In this manner, a reinforced "shielded basin" extends around the coil in the circumferential direction, the function of which according to the present disclosure is explained in more detail below.

FIG. 1 shows a particularly preferred embodiment, wherein the pole shoe is made of an annular pole disc 3aa permanently fixed in place and covered externally by an insulating material, such as plastic. A shielding collar 3ab is interchangeably attached to the annular pole disc 3aa. As can be seen, the annular pole disc 3a and the shielding collar 3ab are preferably connected to each other with no magnetic interruption. This is achieved in that the shielding collar contacts the annular pole disc, preferably by resting thereon from above.

As FIG. 1 also shows, it can be particularly advantageous if the shielding collar comprises a stop segment AS for contacting the sleeve portion and extending into the interior of the induction coil.

As further seen in FIG. 1, in many cases it is particularly advantageous if the shielding collar is divided into individual segments diagonally displaceable, having one motion component in the radial direction and one motion component in the direction parallel to the longitudinal axis L, so that both the open inner diameter of the shielding collar, serving as the tool pass-through opening, and the depth to which the end face of the shielding collar facing toward the sleeve portion penetrates into the interior of the induction coil.

The shielding collar, in any case, ideally has a conical shape or expands in the direction of the longitudinal axis of the coil toward the tip of the tool.

In order to ensure the particularly high-quality shielding desired for the purpose according to the present disclosure, the shielding collar protrudes past the exposed end face of the sleeve portion of the tool holder in the direction of the longitudinal axis L by at least double, preferably by at least 2.75 times the tool diameter.

Careful shielding by means of the first casing 3 and the magnetic covers 3a, 3b still may not be able to prevent a certain stray magnetic field harmful to semiconductor components from being encountered at the outer circumference of the induction coil or in the region of the circumferential surface of the first casing 3. For this reason, it is not known to dispose electronic components sensitive to interfering voltages induced by the stray magnetic field in said region. This is particularly the case for semiconductor components forming a significant portion of the oscillating circuit operated near resonance and used for feeding the induction coil.

To further improve the shielding of the present disclosure, the induction coil and the first casing 3 thereof are enclosed at the outer circumference thereof by a second casing 9, preferably such that the first and second casing contact each other, ideally over most or all of the circumferential surfaces thereof facing each other—at least when cooling of the second casing is not provided.

Said second casing 9 is made of a magnetically nonconductive and electrically conductive material. Here, "electrically conductive" is understood to mean a material not merely locally, or "granularly", electrically conductive, but rather a material allowing the formation of eddy currents to an extent relevant to the present disclosure, as depicted below.

The second casing is preferably designed and preferably so thick in the radial direction that eddy currents are generated therein under the influence of the stray magnetic field of the induction coil permeating said casing, bringing about a weakening of the undesired stray magnetic field.

The principle of active shielding by a counterfield is thus made use of here. It can thereby be achieved that the stray magnetic field at the outer circumferential surface of the second casing is reduced by more than 50%, ideally by at least 75%. It is critical, in any case, that the stray magnetic field at the surface of the second casing be reduced enough that semiconductor components can be disposed there without risk. It is critical that said second casing is separated in the radial direction and magnetically from the induction coil by the first casing, as otherwise said second casing would heat up too much—as is not the case here, as said casing is not present in the main field but rather only in the stray magnetic field.

For the term "casing" used here in conjunction with the second casing, the term as defined above in conjunction with the first casing also applies in the same manner. In conjunction with the second casing, however, the term "casing" does not mean that a circumferentially endless tube segment must be used. Rather, the casing is preferably divided into individual segments electrically isolated from each other, such as by gaps filled with adhesive or plastic. The present embodiment serves for preventing a series short circuit, as would be the result in an endless tube segment if a voltage surge occurred in the second casing and all power semiconductor components lay at the same potential along the second casing. It is important, however, that the individual segments each be so large in design that the stray magnetic field can induce field-attenuating eddy current. In individual cases, this may not require a full casing; rather, a conductive (in view of the concrete individual conditions), sufficiently thick grating structure can be sufficient.

It should be emphasized here that a radially thin-walled housing provided merely for mechanical protection is insufficient, even if said housing were to be made of an electrically conductive material. To achieve the desired effect of the present disclosure, a targeted design of the radial wall thickness of the second material is necessary.

The preferred material for producing the second casing 9 is aluminum.

The second casing 9 can comprise cooling channels in the interior thereof, preferably running in the circumferential direction, optionally helically, in the latter case ideally forming a thread.

In this case it is particularly advantageous to implement the second casing 9 as a two-part or multipart design. The first part thereof then has the cooling channels embedded in the circumference thereof and sealed off by the second part thereof.

Figure 2:
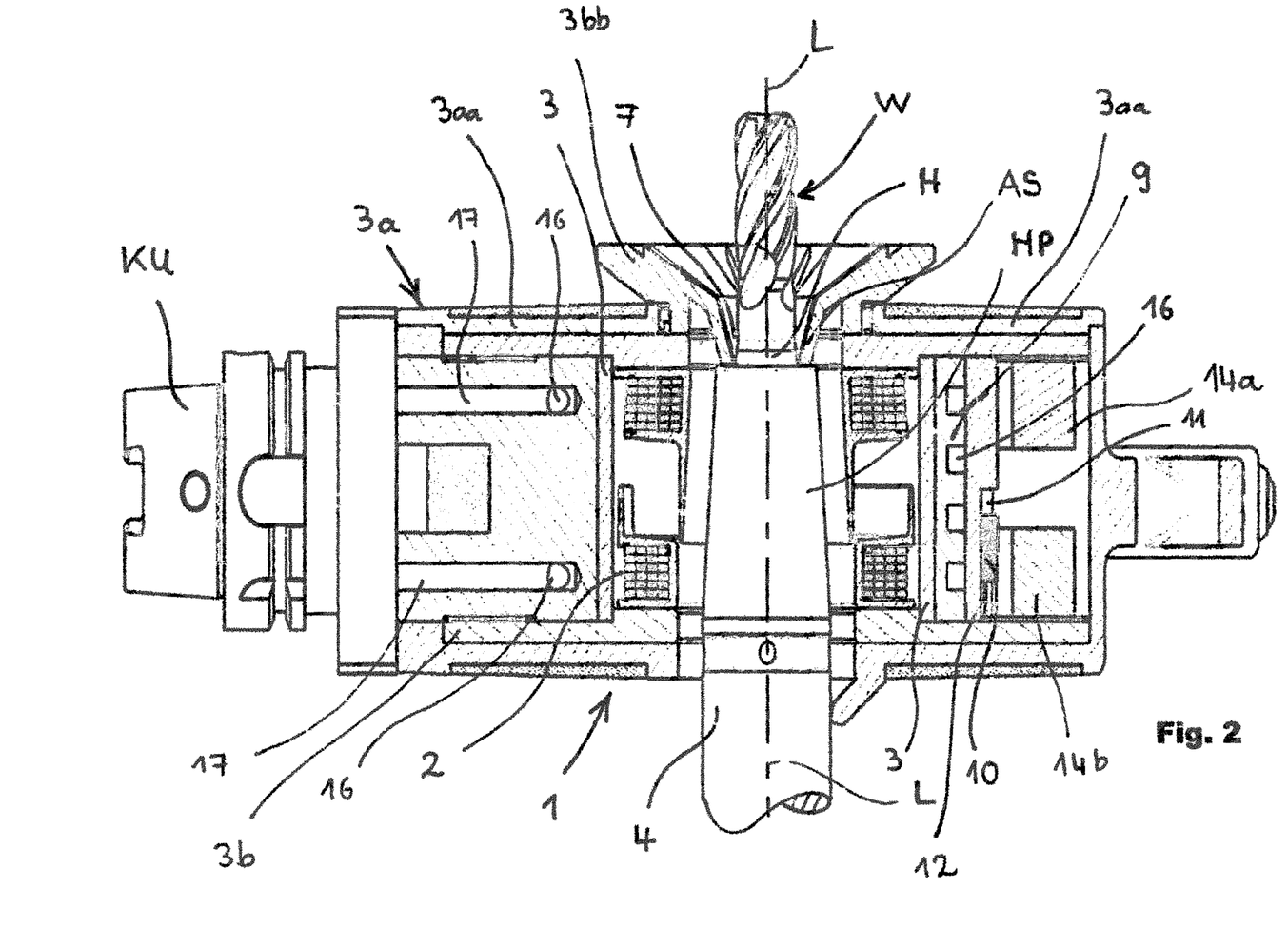
FIG. 2 shows a center longitudinal section of the first embodiment example rotated by 90° about the longitudinal axis L in comparison with FIG. 1.
Figure 3:
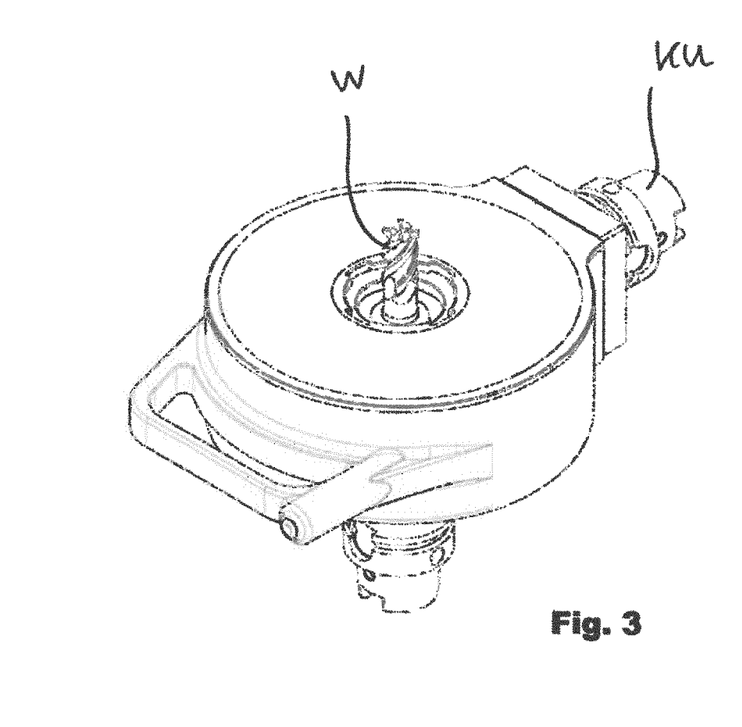
FIG. 3 shows a perspective view of the first embodiment example from diagonally above, with the shielding collar removed.
Figure 4:
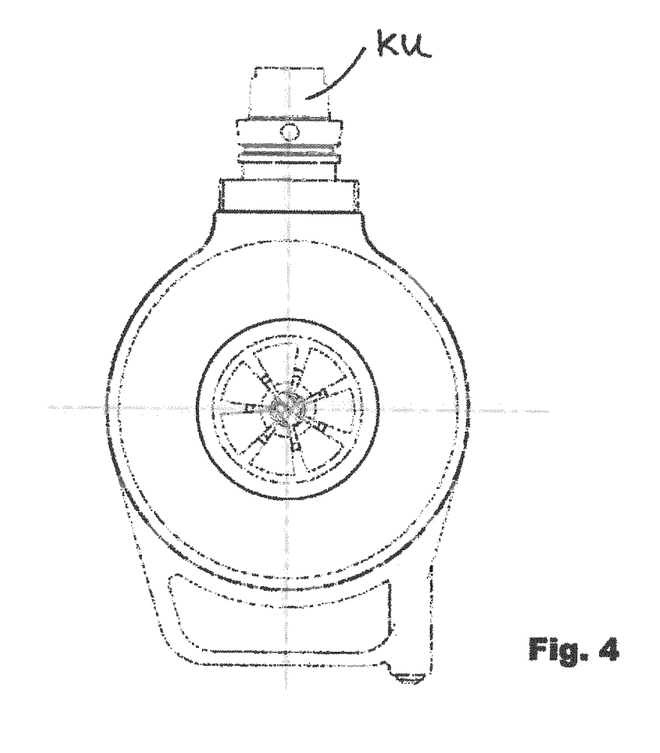
FIG. 4 shows a front view of the first embodiment example from above, with the shielding collar installed.

Reference is made at this point to the left side of FIG. 2. Here, the coolant feeding lines 17 for feeding fresh coolant to the inlet of the cooling channel or channels 16 and discharging used coolant are depicted.

Figure 5:
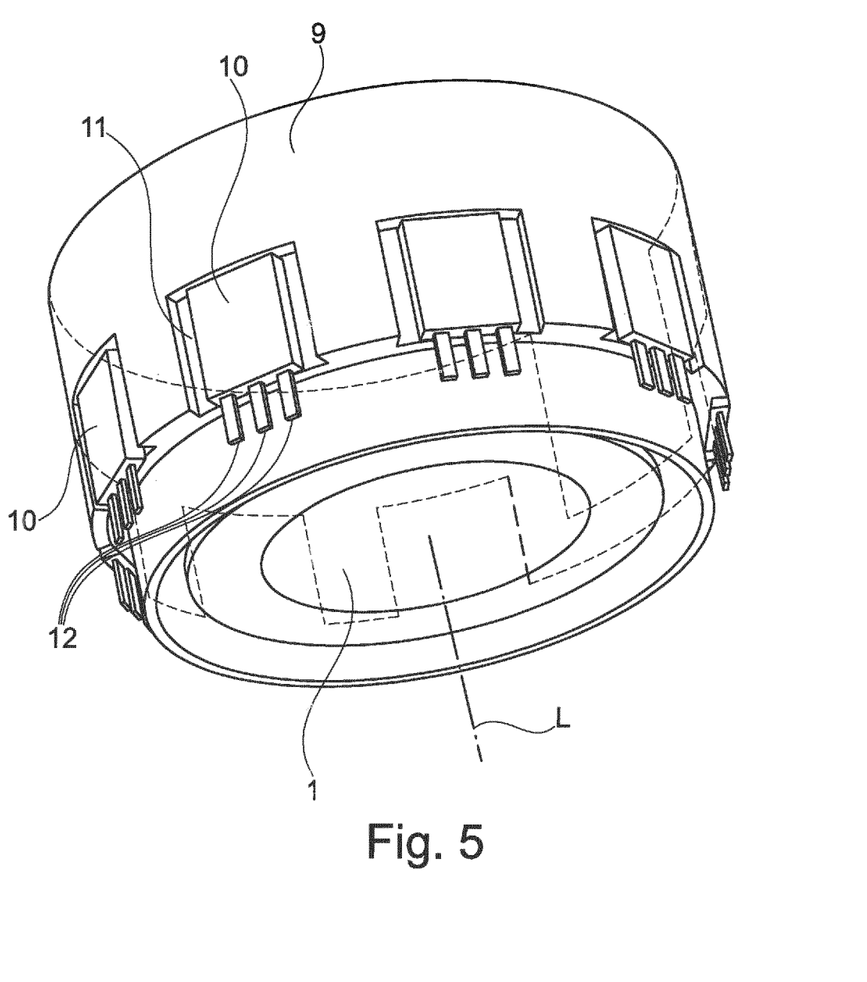
FIG. 5 shows the second casing of the first embodiment example equipped with power semiconductor components.

As depicted in FIG. 2 and FIG. 5, the circumference of the second casing is surrounded by the power semiconductor components, explained in greater detail below, and disposed directly on the outer circumference of the second casing.

In the present instance, the power semiconductor components have two large main surfaces and four small lateral surfaces. The large main surfaces are preferably more than four times larger than those of the individual lateral surfaces. The power semiconductor components 10 are disposed such that the large main surfaces thereof make contact with the second casing 9 for transferring heat, typically at the outer circumference thereof. The large main surface of the power semiconductor component 10 is ideally adhered to the circumferential surface of the second casing 9 by means of a thermally conductive adhesive. The second casing 9 thus has a double function here. Said casing not only improves the shielding and thereby makes it possible to dispose the power semiconductor components in the radial vicinity thereof (less than 10 cm away from the circumferential surface thereof) but also optionally functions simultaneously as a heat sink for the power semiconductor components.

The second casing 9 preferably comprises recesses 11, each of which receives one power semiconductor component, cf. FIG. 5. The recesses 11 are ideally designed to fully enclose on four sides the power semiconductor component 10 received therein. The power semiconductor element 10 is thus seated in a sink, so to speak, and is thereby particularly well shielded.

Furthermore, each of the power semiconductor components 10 comprises three connectors 12 for supplying voltage. The connections 12 of each power semiconductor component 10 protrude here into a region of the second casing 9 forming an offset 13, cf. FIG. 5. Said optional offset 13 optionally facilitates wiring of the connections 12 of each power semiconductor component 10.

Figure 6:
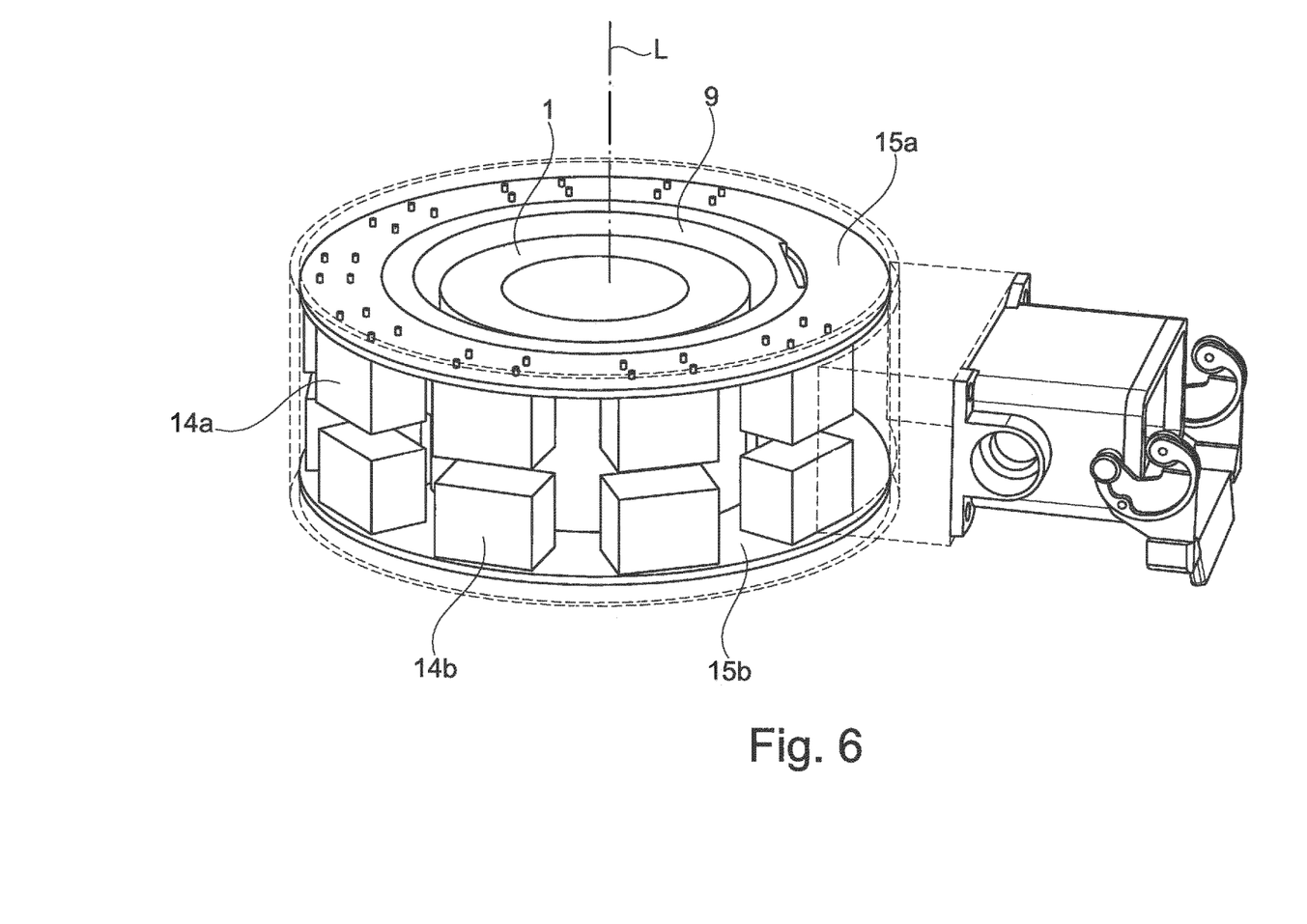
FIG. 6 shows a second embodiment example differing from the first embodiment example only by the type of mounting on the machine tool or on a stand, and thus identical to the first embodiment example with respect to the arrangement of the capacitors and the boards or circuit boards shown here.

The novel arrangement of the power semiconductor components 10 is not solely limited to the present embodiment example. Rather, a preferred solution is implemented here, wherein the capacitors 14a, 14b are grouped around the outer circumference of the induction coil. The capacitors 14a are preferably smoothing capacitors and direct components of the power circuit. The capacitors 14b are preferably oscillating circuit capacitors and also direct components of the power circuit. The capacitors 14a, 14b form a cylindrical ring here when theoretically rotated about the center of the coil. Said cylindrical ring encloses the induction coil and preferably also the power semiconductor components grouped about the circumference thereof. To electrically connect the capacitors 14a, 14b, a plurality of electrical circuit boards 15a, 15b are provided here, each encompassing the outer circumference of the induction coil. Each of said circuit boards 15a, b preferably forms a ring disc. Each of the circuit boards is preferably made of FR4 or a similar material commonly used for circuit boards. As can be seen, the axis of rotational symmetry of each of the two circuit boards implemented here as ring boards is coaxial to the longitudinal axis of the coil. Each of the circuit boards is optionally attached to the interior of the basin of the magnetic covers 3a, 3b where the magnetic covers 3a, 3b protrude past the second casing in the radial direction.

The upper of the two electrical circuit boards 15a supports the capacitors—that is, the smoothing capacitors 14a or the oscillating circuit capacitors 14b—the connecting leads thereof passing through the circuit board or being connected to the circuit board by means of SMD technology, so that the smoothing capacitors descend from the circuit board. The lower of the two circuit boards is constructed correspondingly, and the capacitors—that is, the oscillating circuit capacitors 14b or the smoothing capacitors 14a—stand up away from the same. Altogether, the two electrical circuit boards 15a, b receive all capacitors 14a, 14b of the power circuit feeding the induction coil in between said boards, as seen in the direction along the longitudinal axis of the induction coil.

It can thus be said that the power semiconductors form a first theoretical cylinder surrounding the induction coil and the capacitors 14a, 14b form a second theoretical cylinder surrounding the first theoretical cylinder.

The less sensitive capacitors with respect to the stray magnetic fields preferably form the outer theoretical cylinder, while the power semiconductor components requiring an installation space as free from stray magnetic fields as possible from the inner theoretical cylinder.

It may be necessary to implement the circuit board on which the controller is mounted, and/or the circuit boards contacting the capacitors directly in the power circuit, as shielded circuit boards.

To this end, multilayer circuit boards or what is known as multilayer technology are used. Two or more circuit boards are thereby stacked together. The conductors run mostly or substantially in the interior of the circuit board packet thus produced. At least one external main surface of the circuit board packet is substantially fully metalized and therefore acts as a shield.

As a general note in advance, the coil shown in FIG. 1 is preferably not "fully wound" over the entire length thereof. Rather, said coil is preferably made of two typically substantially cylindrical winding packets. Said packets each form one end face of the induction coil. One of the two coils (here the bottom coil) is displaceable in the direction parallel to the longitudinal axis L and thus adjustable during operation such that only the region of the associated sleeve portion requiring heating is heated. This prevents unnecessary heating and generating an unnecessarily strong field, naturally having a corresponding effect on the stray magnetic field to be encountered. Such a coil further contributes to reducing reactive power, because the windings in the center region are missing and are not absolutely necessary under the aspect of most effective possible heating of the sleeve portion of the tool holder but, if present, have a tendency for producing additional reactive power without providing any actually important contribution to heating.

In order to supply the induction coil to achieve the desired effect and sufficiently rapidly heat up the sleeve portion of a tool holder, it is typically not sufficient to merely connect the induction coil directly to the 50 Hz mains power.

Instead, the frequency of the voltage fed to the coil must be increased. This is typically done electronically by means of a frequency inverter. If the coil is fed simply by means of a frequency inverter, however, without taking further special measures as is commonly done in practice, then high reactive power losses occur.

Said reactive power losses are not further relevant in terms of energy efficiency, as the duty cycle of a shrinking device is short—the induction coil heats up the sleeve portion of a tool holder within a few seconds to a point that the tool shank can be installed or removed, so that the reactive power losses have not previously been considered problematic.

The inventors have now recognized that avoiding reactive power losses is nevertheless important, because said losses lead to heating of the induction coil itself, among other things. To avoid reactive power losses according to the present disclosure, the induction coil is supplied by means of an oscillating circuit. In the oscillating circuit of the present disclosure, most of the required energy oscillates periodically back and forth (at a high frequency) between the induction coil and a capacitor unit. Therefore, only the energy removed from the oscillating circuit by the heating power and other loss power thereof must be fed in each period or periodically. The previous very high reactive power losses are thus eliminated. This means that the components of the power electronics can be miniaturized to the point that said components can be integrated in the coil housing, typically using an additional solution for the particular shielding problem of said installation. A portable induction shrinking device able to be carried by the user to the machine tool due to the total weight thereof of less than 10 kg, to be used at the site, is thus within reach.

Figure 7:
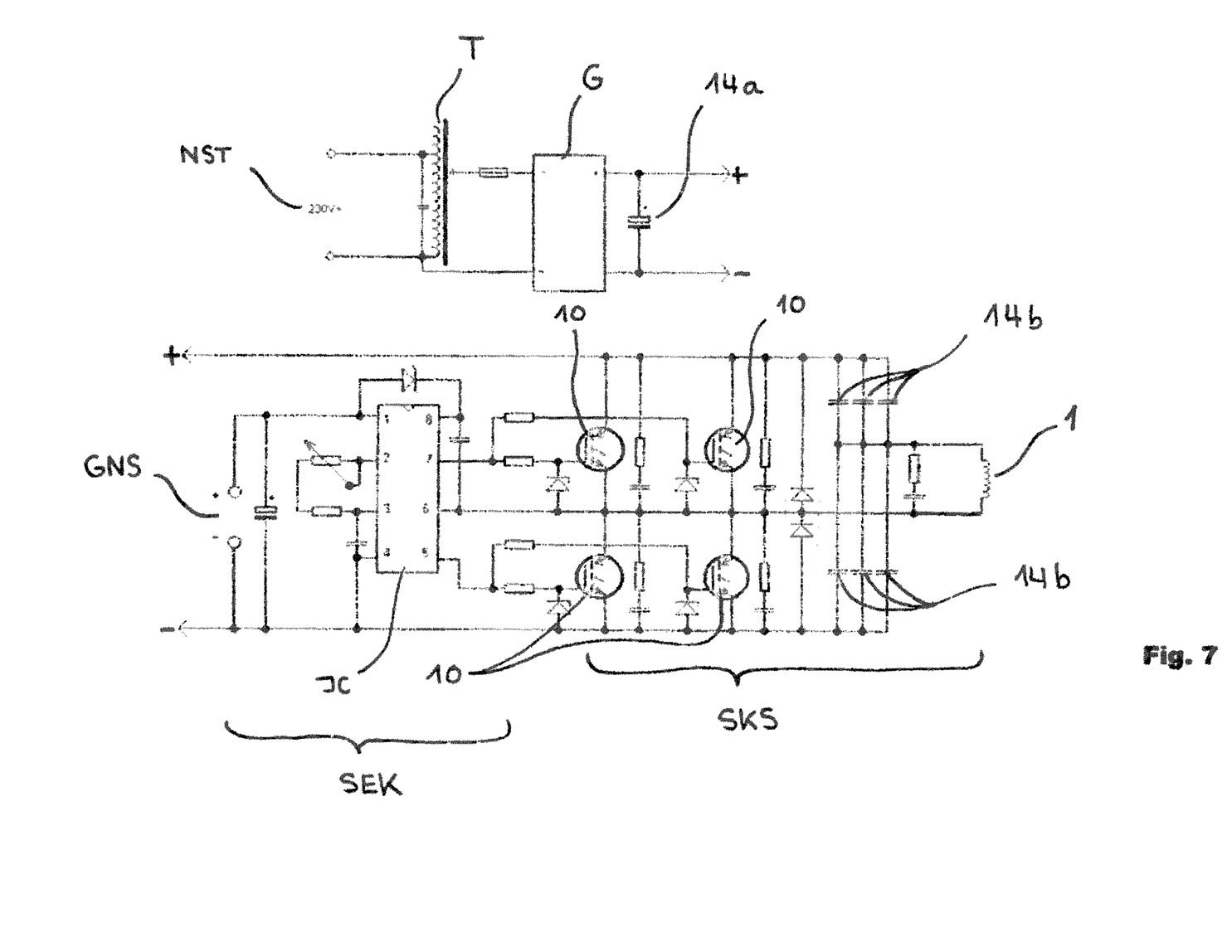
FIG. 7 shows the electrical schematic of a circuit for feeding the induction coil, usable according to the present disclosure for the embodiment examples.

The power electronics feeding the induction coil are preferably designed as shown in FIG. 7 and characterized by the following features.

On the input side, the power electronics are preferably fed by the generally available mains power NST, in Europe 230 V/50 Hz/16$A_{max}$ (with corresponding values in other countries, such as 110 V in the USA). This is made possible because the previous reactive power losses are avoided, while previously a 380 V three-phase connection was required. This does not eliminate the possibility that under particular conditions, such as high power consumption, a three-phase connection may still be needed. Three-phase power can also be used for lower power consumption.

The mains power is then preferably stepped up (transformer T) to a higher voltage in order to reduce the current flowing at the specified power level. The current drawn from the mains is converted to direct current by the rectifier G and in turn is smoothed by the smoothing capacitor or capacitors 14a.

The actual oscillating circuit SKS is fed by means of said direct current. The backbones of the oscillating circuit are formed by the power semiconductor components 10, the oscillating circuit capacitors 14b, and the induction coil 1 used for shrink gripping and shrink releasing. The oscillating circuit is controlled by the control electronics SEK, substantially implemented as an IC and fed with low-voltage direct current via a dedicated input GNS, optionally tapped after the rectifier G and the smoothing capacitor or capacitors 14a via a corresponding resistive voltage divider.

The power semiconductor components 10 are preferably implemented as transistors of the "Insulated Gate Bipolar Transistor" type, IGBT for short.

The control electronics SEK preferably switches the IGBT at a frequency determining the working frequency set at the oscillating circuit SKS.

It is critical that the oscillating circuit SKS never operates exactly at resonance, that is, at a phase shift between the voltage U and current I of cos=1. This would lead here to rapid destruction of the power semiconductor components 10 by the voltage peaks. Rather, the control electronics SEK are designed to operate the power electronics and the oscillating circuit SKS thereof in a working range simply near the resonance or natural frequency thereof. The oscillating circuit is preferably controlled such that 0.9 d cos φ<0.99. Particularly advantageous are values in the range of 0.95<cos φ<0.98. This again leads to avoiding voltage peaks and therefore helps move toward miniaturization.

As a side note, the minimized energy consumption allows battery-powered operation. A motor vehicle starter battery can be used as a suitable high-current battery in the simplest case.

One particular feature of the present disclosure is that for the first time a transportable shrinking unit becomes possible, typically weighing less than 10 kg when ready for operation, and therefore and typically due to the design thereof can be easily transported and manipulated as a "coil housing alone with connector plug". For this reason, said device comes "to the machine tool" in order to be used in service on site at the machine tool. The previous concept of a stationary shrinking machine to which the tool holder must be delivered and from which the tool holder must be transported away again in order to perform a tool change and continue working can thus be eliminated.

Generally speaking, at least the components "induction coil, the first casing, and, if present, the second casing, the power semiconductor components, and preferably also the capacitors" are accommodated in a common housing. In addition to the induction coil, all components necessary for operating the induction coil, including the control electronics, are accommodated in a common housing.

Preferably only one feed cable leaves the housing and serves as the power supply to the shrinking device so implemented, and to this end has a plug at one end thereof for allowing connection to the power supply without tools. The power supply used here is preferably mains power, as mentioned above. The end of the feed cable is then preferably equipped with a protected earth plug meeting any national requirements.

If the shrinking device is to be held in the hand, then centering means are advantageously mounted on the coil housing and facilitate centrally positioning the coil relative to the tool axis. The centering means can be implemented, for example, as radially displaceable fingers Fi, as indicated in FIGS. 1 and 2.

It has been found to be particularly advantageous if the device has at least one coupling KU allowing coupling thereof to the machine tool.

The device can thereby be simply attached to the machine tool and then assumes a safe working position protected against contamination by coolant and chips.

Said coupling KU preferably corresponds to common coupling profiles, such as are used for tool holders to be processed by means of the shrinking device of the present disclosure, such as an HSK profile, as shown in FIG. 2. In order to place the shrinking device of the present disclosure in a safe working position, nothing more is required than decoupling the tool holder for which a tool change is planned from the spindle of the machine tool and coupling the shrinking device in place thereof in the spindle of the machine tool by means of the identical coupling profile thereof. It is particularly advantageous if the coupling of the shrinking device can be operationally removed from the shrinking device, preferably by hand without tools (particularly by means of a bayonet joint). The coupling of the shrinking device can thereby be easily adapted to the type of coupling in use on the particular machine tool, such as a tapered chuck, HSK, etc.

The corresponding couplings are ideally connected to the shrinking device of the present disclosure such that coolant fluid or cooling lubricant output by the cooling system of the machine tool can flow through the at least one cooling channel of the shrinking device, preferably in the second casing thereof, as described above.

A cooling device can thereby also be provided, preferably integrated in the shrinking device (typically adjacent to the induction coil). The sleeve portion of the tool holder is inserted into the same after the shrinking procedure has ended, in order to actively cool down said sleeve portion to a safe contact temperature. Said cooling device is advantageously also fed by the cooling system of the machine tool, typically also via said coupling. For this reason, protection is also sought for the use of the coolant fluid output by a machine tool for cooling purposes (cooling of the second casing and/or of the tool holder) within a shrinking device.

Alternatively, the shrinking device can also be stored in the tool magazine of the machine tool. The tool changer can then either automatically place the shrinking device in the machine spindle, or can deliver the same to a tool chuck clamped in the spindle in order to shrink grip or shrink release a tool. In the second case, the energy feed can be provided via a cable plugged directly into the shrinking device by means of a plug. In both cases, the shrinking device need not be held by hand.

The invention was described based on exemplary embodiments. A person skilled in the art will derive numerous embodiments for implementing the invention without departing from the scope of the present claims. While several aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations, which are within their true spirit and scope. Each embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, although the present disclosure has been specifically disclosed by preferred embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and sub-combinations possible of the group are intended to be individually included in the disclosure.

In general, the terms and phrases used herein have their art-recognized meaning, which can be found by reference to standard texts, journal references and contexts known to those skilled in the art. The above definitions are provided to clarify their specific use in the context of the invention.

REFERENCE LIST

1 Induction coil
2 Windings (electrical winding) of the induction coil
3 First casing
3a Magnetic end cover, preferably in the form of a pole shoe
3aa Annular pole disc
3bb Shielding collar
3b Magnetic end cover
4 Tool holder
5. Shield 5
6 Not assigned
7 Aperture of pole shoe 7
8 Not assigned
9 Second casing
10 Power semiconductor component 1
11 Recess 11
12 Connection 12 of a power semiconductor component
13 Offset of the second casing
14a Smoothing capacitor
14b Oscillating circuit capacitor
15a Electrical circuit board
15b Electrical circuit board
16 Cooling channel 16
17 Cooling channel feed line
G Rectifier
GNS Low-voltage DC power supply for feeding the control electronics
H Mounting shank of the tool
HP Sleeve portion of the tool holder
IC Integrated circuit as part of the control electronics
KU Coupler for coupling the shrinking device to a machine tool
L Longitudinal axis of the induction coil and the tool holder
NST Mains power
SEK Control electronics
SKS Oscillating circuit
T Transformer
W Tool
Fi Radially displaceable finger for centering the sleeve portion or the tool holder in the induction coil.

The invention claimed is:

1. A shrinking device for shrink gripping and shrink releasing tool shanks from tool holders, comprising:
an induction coil, wherein the induction coil and a first casing thereof are enclosed by a second casing;
the first casing made of a magnetically conductive and electrically nonconductive material;
the second casing made of a magnetically nonconductive and electrically conductive material and designed for weakening a stray magnetic field occurring in the surrounding area thereof by forming eddy currents; and
the induction coil and at least power semiconductor components for producing alternating voltage for feeding the induction coil and converted from mains power are accommodated in an induction coil housing.

2. A shrinking device for shrink gripping and shrink releasing tools, comprising:
a tool receptacle comprising a sleeve portion open at the exposed end thereof for receiving a tool shank with a friction fit and made of an electrically conductive material,
an induction coil enclosing the sleeve portion of the tool receptacle, the induction coil implemented as an annular or cylindrical coil for heating the sleeve portion, the induction coil supporting a first casing made of a magnetically conductive and electrically nonconductive material on the outer circumference thereof,
power semiconductor components for producing an alternating current feeding the induction coil, and
an induction coil housing, wherein the induction coil and the first casing thereof are enclosed at the outer circumference thereof by a second casing made of a magnetically nonconductive and electrically conductive material and designed such that a stray magnetic field occurring in the vicinity thereof generates eddy currents in the second casing and thereby weakens the stray magnetic field, and
wherein at least the power semiconductor components are accommodated together with the induction coil in the induction coil housing, the induction coil housing enclosing the induction coil, the first and second casing thereof, and the power semiconductor components at least along the circumference of the induction coil.

3. The shrinking device of claim 2, wherein the power semiconductor components are disposed directly on the outer circumference of the second casing.

4. The shrinking device of claim 3, wherein the device comprises a coupling for attaching the device in the chuck of a spindle of a machine tool.

5. The shrinking device of claim 4, wherein the shrinking device is designed for being fed with coolant by a cooling system of the machine tool.

6. The shrinking device of claim 3, wherein the second casing forms a heat sink for the power semiconductor components.

7. The shrinking device of claim 2, wherein the second casing has one or more recesses, each receiving one of the power semiconductor components, such that each power semiconductor component is enclosed by the second casing on four sides.

8. The shrinking device of claim 2, wherein the device comprises a rectifier and a smoothing or oscillating circuit capacitor for producing a high-frequency alternating voltage internal to the device for feeding the power semiconductor components,
wherein the smoothing capacitors and/or the oscillating circuit capacitors are grouped around the outer circumference of the induction coil in a cylindrical form.

9. The shrinking device of claim 2, wherein the end face of the induction coil facing away from the tool receptacle is covered by a cover made of a magnetically conductive and electrically nonconductive material, in the form of a pole shoe covering the entire end face.

10. The shrinking device of claim 9, wherein the cover comprises a local shielding collar protruding past the exposed end face of the sleeve portion of the tool receptacle in the direction of a longitudinal axis L by at least twice the amount of the tool diameter.

11. The shrinking device of claim 10, wherein the shielding collar can be replaced without tools.

12. The shrinking device of claim 2, wherein the end face of the induction coil facing toward the tool receptacle is covered by a magnetically conductive and electrically nonconductive material.

13. The shrinking device of claim 2, wherein the device comprises at least one electrical board or film enclosing the outer circumference of the induction coil and electrically contacting smoothing capacitors and/or the power semiconductor components,
wherein the at least one electrical board or film is coated with an electrically conductive layer at least at the external sides thereof, said layer being grounded in order to dissipate potential voltages.

14. The shrinking device of claim 13, wherein the at least one electrical board or film is a ring board, the axis of rotational symmetry thereof running coaxial to, or otherwise parallel to, the longitudinal axis of the induction coil.

15. The shrinking device of claim 14, wherein the at least one electrical board or film comprises two ring boards between which the smoothing capacitors are disposed along the circumference of the induction coil.

16. The shrinking device of claim 2, wherein the second casing forms one or more cooling channels running in the interior thereof.

17. The shrinking device of claim 2, wherein smoothing capacitors and also electronics for actuating the power semiconductor components are accommodated in the interior of the induction coil housing or a coil housing ring which forms the induction coil housing, said induction coil housing or coil housing ring enclosing at least the circumference of the induction coil and also covering at least one or both end faces of the induction coil.

18. The shrinking device of claim 17, wherein alternating current is fed to the device from a mains.

19. The shrinking device of the claim 2, wherein the shrinking device is battery-powered.

20. The shrinking device of claim 2, further comprising a shielding collar made of individual segments displaceable in the radial direction and in the axial direction.

21. The shrinking device of claim 2, wherein centering organs are provided on the end face of the induction coil facing toward the tool receptacle and/or in an interior clearance space formed between circumferential segments of the induction coil, said organs facing coaxial positioning of the sleeve portion in the induction coil when said sleeve portion is inserted into the induction coil.

22. The shrinking device of claim 2, wherein the induction coil comprises at least two coil winding segments displaceable toward each other or away from each other in the direction parallel to the longitudinal axis during operation for the purpose of adjusting to the geometry of a sleeve portion to be heated.

23. The shrinking device of claim 2, wherein alternating current with a frequency greater than 1 kHz is applied to the induction coil during use.

24. The shrinking device of claim 2, wherein the induction coil housing is made of an insulating material.

25. A shrinking system comprising the shrinking device of claim 2, wherein various couplings attachable to the shrinking device, by means of which the shrinking device can be fixed to a spindle of a machine tool, are part of the shrinking system.

* * * * *